United States Patent [19]

Nishijima

[11] 4,107,654
[45] Aug. 15, 1978

[54] NUMERICAL CONTROL SYSTEM HAVING A POSITION PROCESSING UNIT OPERATED UPON A POWER FAILURE

[75] Inventor: Tadashi Nishijima, Hamura, Japan

[73] Assignee: Tokyo Shibaura Electric Co., Ltd., Kawasaki, Japan

[21] Appl. No.: 766,346

[22] Filed: Feb. 7, 1977

[30] Foreign Application Priority Data

Feb. 6, 1976 [JP] Japan .................................. 51-12006

[51] Int. Cl.² ...................... G05B 13/02; G05B 19/18
[52] U.S. Cl. .............................. 340/147 MT; 318/569; 318/601
[58] Field of Search ..................... 340/147 MT, 147 P; 235/151.11; 318/563, 569, 600, 601, 478

[56] References Cited

U.S. PATENT DOCUMENTS 3,917,930   11/1974   Davey et al. ......................... 318/569

FOREIGN PATENT DOCUMENTS 961,568   1/1975   Canada .............................. 340/147 MT Primary Examiner—Donald J. Yusko
Attorney, Agent, or Firm—Oblon, Fisher, Spivak, McClelland & Maier

[57] ABSTRACT

A numerical control system includes a machine tool position processing unit operated upon a power failure. The machine tool position processing unit is adapted to normally generate a present position output for each sampling time in response to an output corresponding to the absolute position of the machine tool as detected at a resolver, adapted to store and hold the absolute position data when a power supply is interrupted, and adapted to generate, when a power supply is resumed, an output corresponding to a corrected present position of the machine tool as obtained by correcting an overtravel effected by the machine tool at the power interruption time.

9 Claims, 7 Drawing Figures

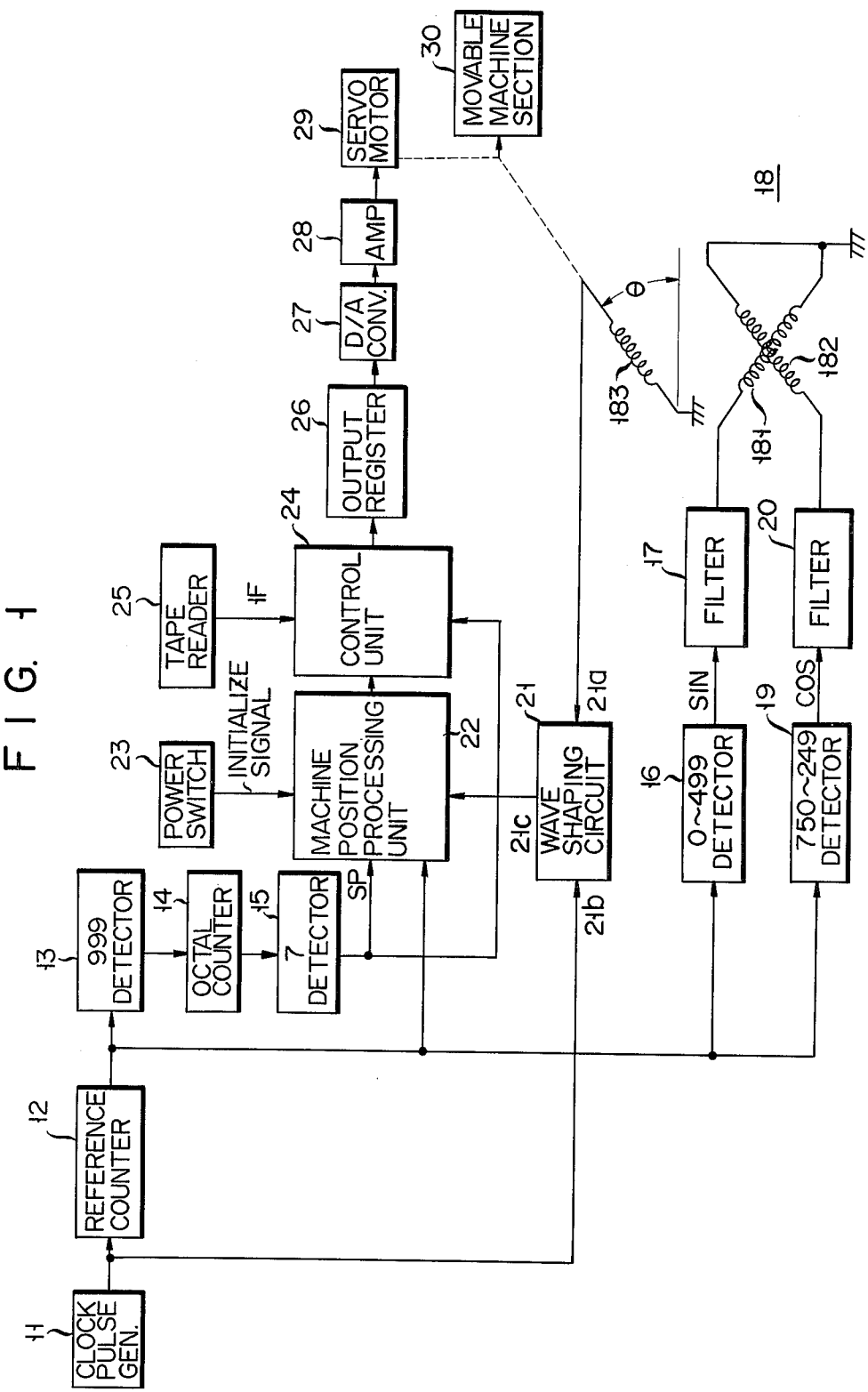
F I G. 1

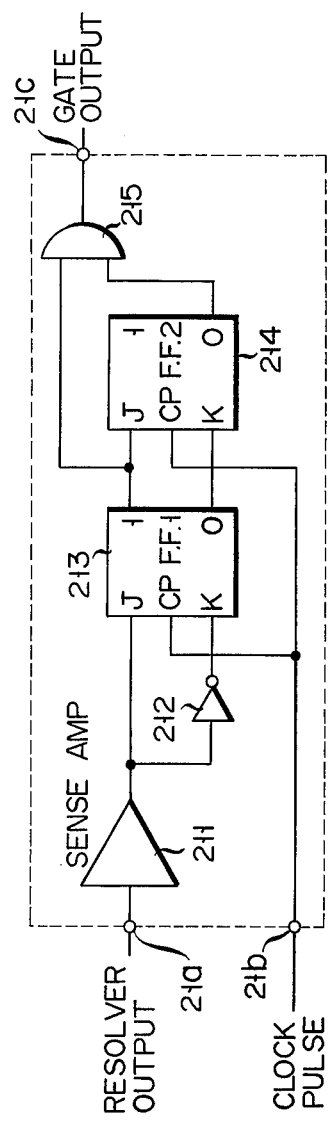
F I G. 2
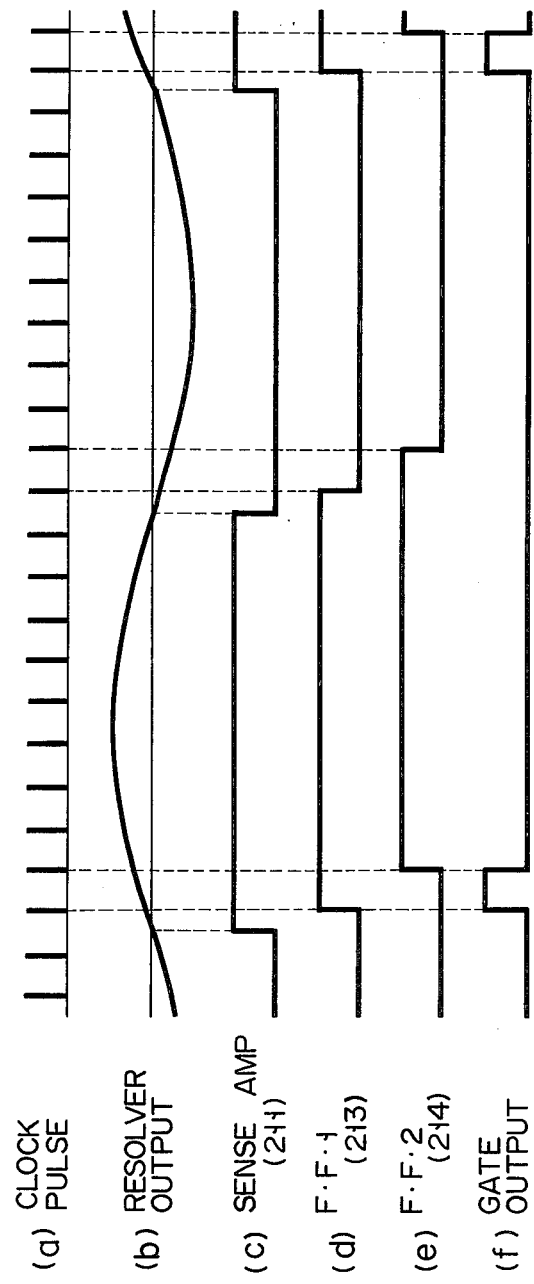
F I G. 3

(a) MEMORY (441, 442)
(b) POSITION COUNTER (411, 412)
(c) REGISTER (451, 452)

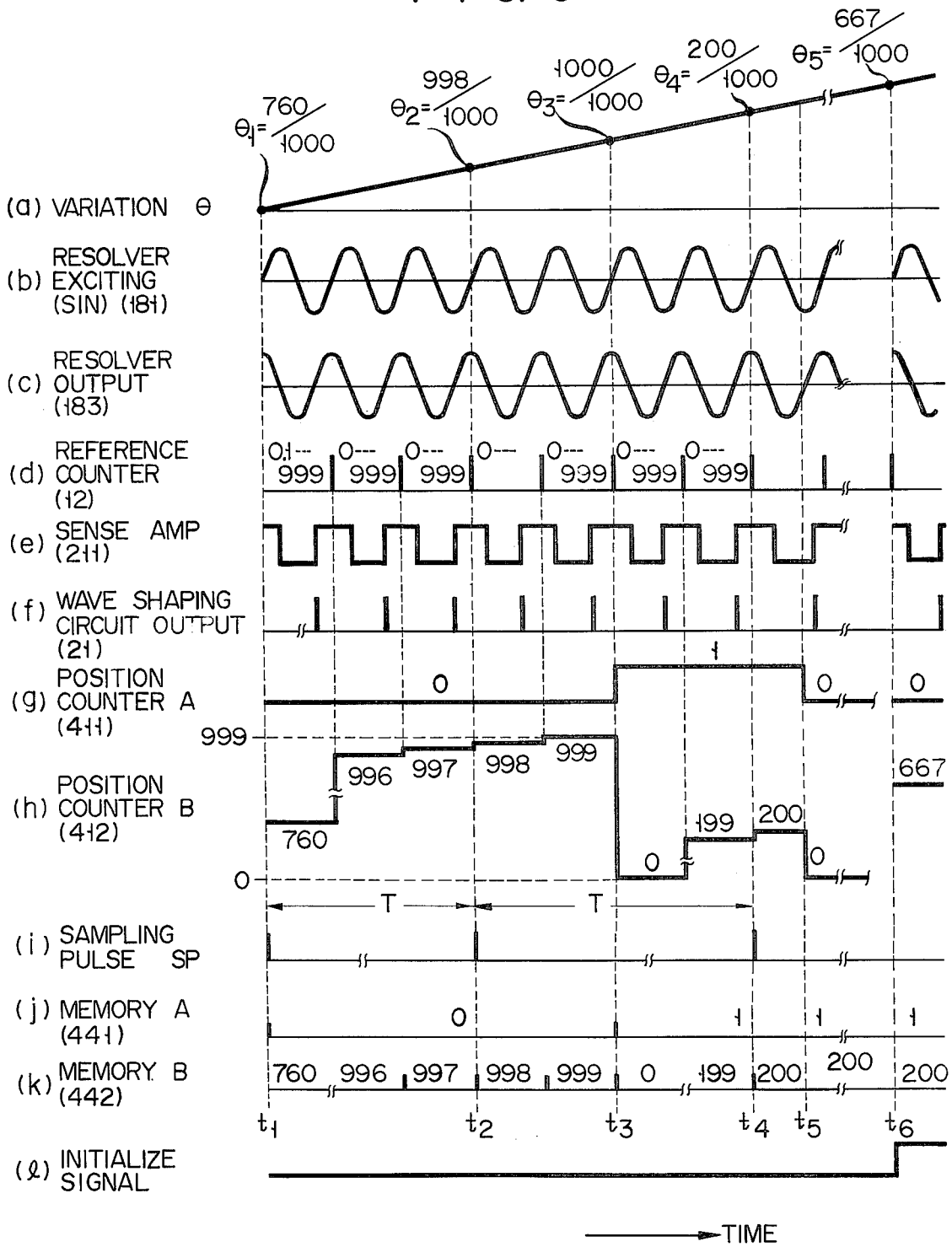

NUMERICAL CONTROL SYSTEM HAVING A POSITION PROCESSING UNIT OPERATED UPON A POWER FAILURE

BACKGROUND OF THE INVENTION

This invention relates to a numerical control system for controlling a machine tool, and in particular an improved numerical control system capable of starting a control from a corrected present position of the machine tool irrespective of a power failure.

A numerical control system, as well known, is adapted to control a machine tool to permit the latter to machine a workpiece into a desired shape. A positioning control and continuous cutting control are known in such a numerical control system.

A numerical control is effected by reading by means of a tape reader an instruction tape in which an instruction relating to a movement path of a machine tool is punched, storing the instruction in an input memory, comparing an instruction data stored in the input memory with a data corresponding to the present position of the machine tool, and driving the machine tool by a drive mechanism into an instruction position based on the result of comparison.

An open loop control system (using a pulse motor) and a closed loop control system are known as a drive system for a machine tool. The closed system is adapted to feedback a data corresponding to the present position of the machine tool using a position detector. The open loop control system is adapted to updata the contents of a present position memory by the number of pulses delivered to a drive mechanism, while on the other hand the closed loop control system is adapted to update the contents of a present position memory according to a signal corresponding to an actual position of a position detector which is mounted on the machine tool. In the latter system, therefore, a high precision system results.

In the above mentioned conventional numerical control system an integral circuit constructed of semiconductor logical elements is used as a memory for storing a data corresponding to the present position of the machine tool. When a machining operation is interrupted or a power supply is interrupted due to a power failure, the present position data stored in the memory is destroyed. When the machining operation is to be resumed, it is necessary to move a movable section of the machine tool to an original point. Therefore, the conventional numerical control needs to have the function for returning the movable section of the machine tool to the original position so as to obtain an accurate position of the machine tool when a power supply to the numerical control system is resumed. This makes the readjustment of the tool position more difficult.

SUMMARY OF THE INVENTION

It is accordingly the object of this invention to provide a numerical control system for a machine tool which can produce an output corresponding to an accurate present position of the machine tool irrespective of a power failure so as to permit the machine tool to continue a machining operation, when a power supply to resumed, without the necessity for returning a movable section of the machine tool to an original position.

According to this invention there is provided a numerical control system having a position processing unit operated upon a power failure, comprising a tape reader for inputting a numerical data for instructing an action of a machine tool; control means for receiving an instruction data from the tape reader and a data corresponding to the present position of the machine tool and calculating an amount of movement to be made by the machine tool for each predetermined time period; means for driving the machine tool based on an output from the control means which corresponds to the amount of movement of the machine tool; detection means for detecting the position of a movable section of the machine tool; and machine tool position processing means adapted to normally receive a detection output of said detection means, calculate the present position of the machine tool for each said predetermined time period and supply a present position data to said control means, adapted to store and hold the present position data when a power supply to the NC system is interrupted, and adapted to, when a power supply to the NC system is resumed after the power interruption, send to said control means a data corresponding to a corrected present position of the machine tool as obtained by correcting an overtravel effected by the machine tool at the power interruption time.

BRIEF DESCRIPTION OF THE DRAWING

This invention will be further described by way of example by referring to the accompanying drawings in which:

FIG. 1 is a block diagram showing a numerical control system according to the embodiment of this invention;

FIG. 2 is a detailed view showing a wave shaping circuit in FIG. 1;

FIG. 3 is a time chart for explaining the operation of the wave shaping circuit in FIG. 2;

FIG. 5 is a time chart for explaining the operation of the numerical control system of this invention, mainly, the circuit shown in FIG. 4;

FIG. 6A shows a stop position of a machine tool at a power failure and FIG. 6B shows the contents of a position counter and memory in FIG. 4 when a power supply is interrupted.

DETAILED DESCRIPTION OF THE PREFERRED EMBODIMENTS

Figure 4:
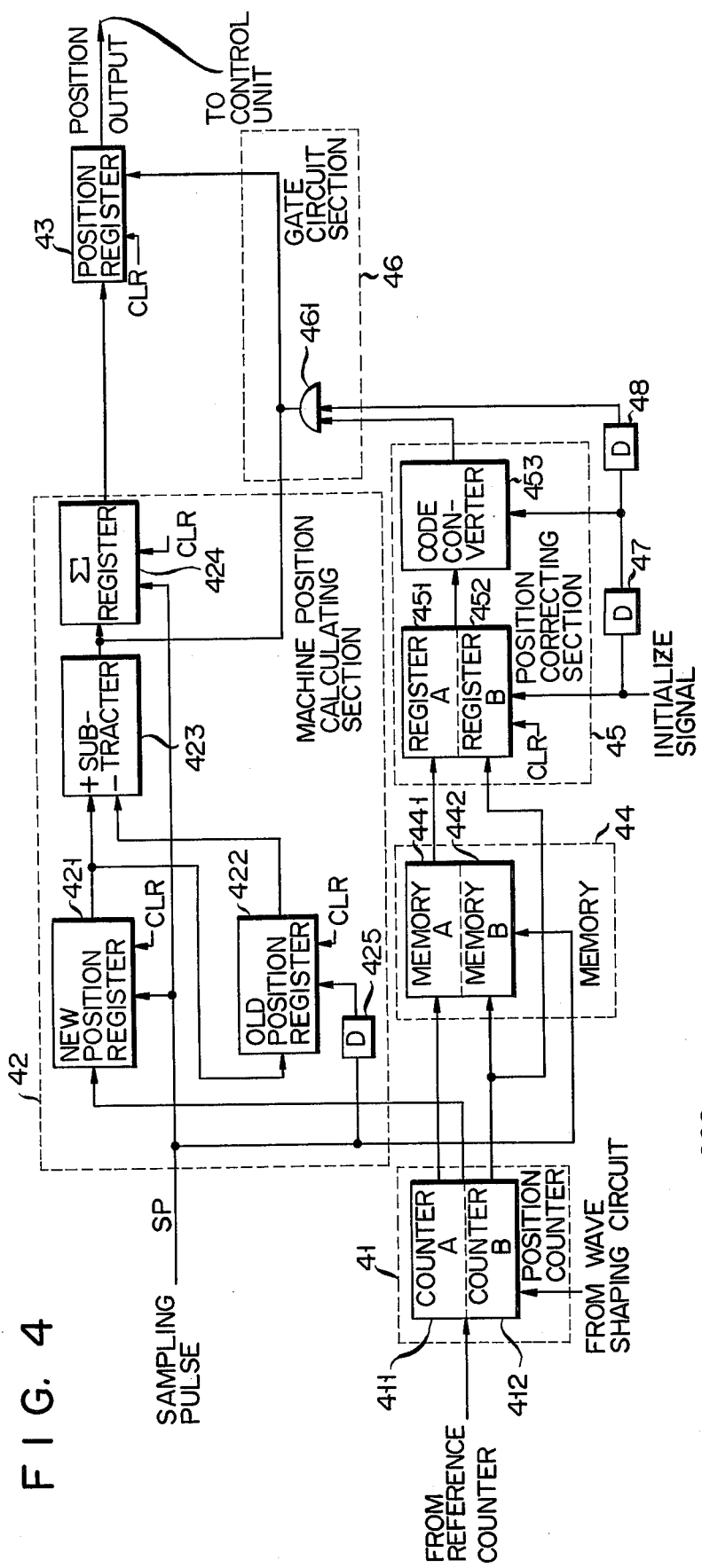
FIG. 4 is a detailed circuit diagram showing a machine tool position processing unit in FIG. 1.

In FIG. 1 is shown a numerical control system for a machine tool which is according to this invention. A clock pulse generator 11 generates a clock pulse having a frequency of, for example, 5 MHz. The clock pulse of the clock pulse generator 11 is applied to a reference counter 12. The reference counter 12 is a scale of −1000 counter and counts 0 to 999. The counter 12 generates a clock pulse having a frequency which is frequency divided to 5 MHz/1000 = 5 kHz. The output of the reference counter 12 is applied to a "999" detector 13. The detector 13 detects a time at which the content of the reference counter 12 varies from "999" to "0", and generates a clock pulse. In consequence, the detector 13 generates a clock pulse with a frequency of 5 MHz/1000 = 5 kHz. The output of the detector 13 is applied to an octal counter 14, the output of which is in turn applied to a "7" detector 15. The detector 15 generates a clock pulse having a frequency which is frequency divided to 5 kHz/8 = 625 Hz. The output clock pulse of the detector 15 is indicated by a sampling pulse SP which is used in the operation of a machine position processing unit as will be later described.

The output pulse of the reference counter 12 is also applied to a "0–499" detector 16. This detector 16 generates an output having a logical level "1" only during a time period in which the content of the reference counter 12 is "0" to "499", and generates an output having a logical level "0" during a time period in which the content of the reference counter 12 is "500" to "999". The output of the detector 16 is passed through a filter 17 where a high frequency wave component is removed, and applied to one stator winding 181 of a resolver 18 to cause the latter to be excited.

The output of the reference counter 12 is supplied to a "750–249" detector 19. The detector 19 generates an output of logical level "1" only a time period in which the content of the reference counter 12 is "750" to "249". The output of the detector 19 is passed through a filter 20 where a high frequency wave component is removed, and supplied to the other stator winding 182 of the resolver 18 to cause the latter to be excited. The output of the detector 16 is 90° out of phase with respect to the output of the detector 19. With the output of the detector 16 indicated by a sine wave, the output of the detector 19 is indicated by a cosine wave.

The resolver 18 is a position detector for detecting the position of a machine tool and it is used in the detection and transmission of a rotation angle. The resolver 18 includes, as conventionally known in the art, a pair of stator windings 181, 182 and a rotor winding 183 connected to a laod shaft and adapted to be rotated together with the load shaft. An exciting current is supplied in a 90° out-of-phase rotation to the stator windings 181 and 182 and an electric signal corresponding to the rotation angle $\theta$ (that is a variation of the machine tool) of the load shaft is delivered from the rotor winding 183. As a position detector for a machine tool a position encoder is used in place of the resolver and in this case no resolver exciting circuit is required, making it possible to simplify a circuit for the NC system.

An exciting voltage induced in the rotor winding 183 of the resolver is applied to one input terminal 21a of a wave shaping circuit 21 and the clock pulse of the clock pulse generator 11 is applied to the other input terminal 21b of the wave shaping circuit 21.

When an input voltage (resolver output voltage) to the input terminal 21a of the wave shaping circuit 21 varies from a negative level to a positive level, the wave shaping circuit 21 generates from its output terminal 21c in receipt of the clock pulse of the clock pulse generator 11 a pulse having a width corresponding to one clock pulse. That is, with the minimum unit rotation angle of the machine tool indicated by 1/1000 (one rotation angle of the machine tool is divided into 1000 equal portions), the wave shaping circuit 21 delivers an output for each minimum unit rotation angle of the machine tool which is detected at the resolver 18. As will be described later, the output pulse of the wave shaping circuit 21 is in synchronism with the reference signal of the reference counter 12.

FIG. 2 shows a detail of the wave shaping circuit 21. The wave shaping circuit 21 comprises a sense amplifier 211 for amplifying the output signal of the rotor winding 183 in the resolver 18 into a rectangular wave, an inverter 212 for inverting the output of the sense amplifier 211, a first flip-flop 213 adapted to be set or reset by the clock pulse in accordance with the output variation of the sense amplifier 211, a second flip-flop 214 adapted to be set or reset by the clock pulse in receipt of the output of the first flip-flop 213, and an AND gate to which the outputs of the first and second flip-flops 213 and 214 are coupled.

FIG. 3 shows a time chart of the wave shaping circuit 21.

When an output (FIG. 3b) of the rotor winding 183 in the resolver 18 is supplied through the terminal 21a to the sense amplifier 211 in the wave shaping circuit 21, the sense amplifier 211 generates a rectangular wave as shown in FIG. 3(c). When the output of the sense amplifier 211 is at a "1" level the flip-flop 213 is set at shown in FIG. 3(d) by a clock pulse as shown in FIG. 3(a). The flip-flop 214 is set as shown in FIG. 3(e) by a next clock pulse which is delayed by an amount corresponding to one clock pulse. In consequence, the AND gate 215 generates a pulse as shown in FIG. 3(f) which corresponds to one clock pulse.

The output of the wave shaping circuit 21 is applied to a machine tool position processing unit 22, and the output of the reference counter 12 and sampling pulse SP of the detector 15 are supplied to the machine tool position processing unit 22. The processing unit 22 is adapted to store a data corresponding to the present position of a movable section 30 of the machine tool when a power supply to the NC system is interrupted due to a power failure or an accident. When, for example, a power switch 23 is closed to permit a power supply to the NC system the processing unit 22 generates an output for permitting the machine tool to be moved from the present position based on the stored data. In this case, the processing unit 22 corrects any positional deviation as occurring a power failure and generates an output corresponding to a correct present position of the machine tool.

The position output of the processing unit 22 is supplied to a control unit 22 and a position instruction data IF of a tape reader 25 is applied to the control unit 22. For example, an automatic positioning instruction, continuous machining instruction etc. are used as the position instruction and these instructions are punched in a paper tape. The control unit 24 receives an instruction position data from a tape reader 25, the position output of the processing unit 22 and a sampling pulse SP of the detector 15 to generate a signal corresponding to a position error for each sampling time SP. The position error indicates a difference between the present position of the machine tool and the instruction position corresponding to each sampling time. The control unit 24 can be easily provided as any suitable circuit, by using an ordinary NC technology. For example, the control unit 24 permits distribution of each instruction data, calculates a positional error corresponding to each sampling time and delivers an output corresponding to an amount of movement of the machine tool for each sampling time.

The positional error output of the control unit 24 is stored in an output register 26 and the output of the output register 26 is supplied to a conventional servo drive mechanism to permit the machine tool to be moved. That is, the output of the output register 26 is converted at a digital-analog converter 27 from a digital amount to an analog amount. The output of the output register 26 is fed through the digital-analog converter 27 and amplifier 28 to a servo motor 29 to cause the latter to be driven. With the rotation of the motor 29 the movable section 30 of the machine tool mechanically coupled to the motor 29 is moved in the axial direction (X-aixs, Y-axis), while at the same time the rotation angle θ of the rotor winding 183 in the resolver 18 is varied.

FIG. 4 shows a detail of the processing unit 22 and FIG. 5 is a time chart for explaining the operation of the processing unit 22.

In FIG. 4 a position counter 41 comprises a scale of 1000 counter A411 adapted to device the excitation signal (FIG. 5b) of the resolver 18 into 1000 equal parts and indicate the number of rotations of the resolver 18, and a scale of 1000 counter B412 adapted to indicate a numerical value corresponding to rotation angle θ of the resolver 18. The position counter 41 receives a reference output signal of the reference counter 12 in response to the output pulse of the wave shaping circuit 21 and the reference output signal is applied to the counter 41. In this case, the output pulse of the wave shaping circuit 21 is in synchronism with the clock pulse of the clock pulse generator 11 and as the excitation signal of the resolver 18 use of made of the output signal of the reference counter 12 which is obtained by frequency dividing the clock pulse of the clock pulse generator 11 by a factor of 1000. As a result, the number of rotations of the resolver 18, as well as the rotation angle, can be indicated by the reference signal of the reference counter 12 on the position counter 41.

When the resolver 18 is rotated in a normal direction as shown in FIGS. 5(g) and (h) the value of the counter B412 is incremented from "0" to "999" and upon a change from "999" to "0" a carry is supplied from the counter B412 to the counter A411 to permit an incremental addition of "1" to the counter A411. When, on the other hand, the resolver 18 is rotated in a reverse direction the value of the counter B412 is decremented from "999" to "0" and upon a change from "0" to "999" a borrow is effected from the counter A411 to permit a decremental subtraction of "1" from the counter A411. That is, the counter B412 indicates the rotational position of one rotation cycle (0–999) of the resolver 18 and the counter A411 indicates the number of rotations of the resolver 18. In consequence, the contents of the position counter 41 indicates the absolute position of the machine tool on which the resolver 18 is mounted.

The output of the position counter 41 is applied to a machine tool position calculating unit 42 where the present position of the machine tool is calculated in a binary representation for each sampling time. The tool position calculating unit 42 comprises a new position register 421 for storing for each sampling time an absolute position data which is stored in the position counter 41, an old position register 422 for storing the output of the new position register 421 after one sampling time, a subtractor 423 for obtaining a difference between the outputs of the new and old position registers, and an accumulator (Σ register) 424 for accumulating the outputs of the subtractor 42 for each sampling time. The timing in which the output of the new position register 421 is stored in the old position register is attained by using a sampling pulse SP delayed one sampling time at a delay circuit 425.

With $X_{NT}$ representing the absolute position of the machine tool at the X-axis of the machine tool at time NT (N is an integer) and $X_{(n-1)T}$ representing the absolute position of the machine tool at time (N−1)T after one sampling time, the absolute position value $X_{NT}$ is stored at time NT in the new position register 421 and the absolute position value X(N−1T) is stored at time (N−1)T in the old position register 422. The subtractor 423 takes a difference between the values of the new and old position registers and differences from the subtractor 423 are sequentially accumulated at the register 424. Thus, the present X-axis position value X of the machine tool can be expressed as follows:

$$X = \sum_{N=1}^{NT} \{X_{NT} - X_{(N-1)T}\}$$

The present position value X is represented in a binary code. The present value X at a predetermined time of the machine tool as calculated at the tool position calculating unit 42 is stored in a position register 43. The position output of the register 43 is sent to the control unit 24.

The data of the position counter 41 is stored in a memory 44. That is, a data corresponding to the number of rotations of the counter A411 is stored in a memory A441 and a data corresponding to the rotation angle of the counter B412 is stored in a memory B442. The memory 44 for storing a data corresponding to the absolute position value of the machine tool is of a permanent storage type and it is constructed of a magnetic circuit such as a core memory. The memory 44 can be constructed of an ordinary semiconductor memory element. In this case, the memory contents can be maintained by using a battery as a power source for driving the semiconductor memory element. The memory 44 can also be constructed of a semiconductor element having a nonvolatile region and in this case the memory contents are transferred upon a power failure to the nonvolatile region of the semiconductor element for data maintenance. The value of the memory 44 is updated for each sampling time T and when the machine tool is at rest the memory 44 indicates an accurate absolute position of the machine tool. That is, the memory 44 stores data representative of the number of rotations of the machine tool and rotation angle of the machine tool which correspond to the operation of the resolver 18 having a position detection function.

Upon a power failure the registers 421, 422, 424 and 43 are all cleared by a clear signal CLR. When a power supply to the NC system is restarted after the power failure an initializing signal is deliverd, for example, through the power switch 23 to a position correcting section 45 in the processing unit as will be explained later. The position correcting section 45 is adapted to correct a displacement of the machine tool between at the power failure time and at the power recovery time and convert the present position value of the machine tool as expressed in an absolute value to an actual present position value of the machine tool. The data (the number of rotations) of the memory A441 in the memory 44 and the data (rotation angle) of the counter B412 in the position counter 41 lead to the position correcting section 45 by the above-mentioned initializing signal. The position correcting section 45 comprises a register A451 for storing the contents of the memory A441, a register B452 for storing the contents of the counter B412, and a code converter 453 for converting a data corresponding to the absolute position of the machine tool to a value corresponding to an actual position of the machine tool. The code counter 453 converts a scale of 1000 code to a binary code. That is, since the contents (absolute position value of the machine tool) of the position counter 41 is represented in a scale of 1000 code and the value X corresponding to the present position of the machine tool as calculated at the calculating unit 42 is represented in a binary code, a code conversion is effected to make the contents of the position counter 41 equal to the contents of the register 424. Since the machine tool is not stopped immediately upon interruption of a power supply and stopped at a position somewhat displaced away from a position at the power interruption time of the machine tool, the position correcting section 45 delivers at a power recovery time an output corresponding to a corrected present position of the machine tool at which the displacement of the machine tool is corrected. The output of the code converter 453 is passed through a gate circuit section 46 and preset by an intializing signal into the position register 43. In consequence, at the power recovery time a data corresponding to the present position of the machine tool is fed through the position correcting section 45 to the position register 43. The gate circuit section 46 is adapted to control such a correction operation during a time period involved from the power recovery until the NC system is operated in a steady state. The gate circuit section 46 comprises an AND gate 461 for controlling the corrected present position output of the position correcting section 45 by the initialized signal from delay circuits 47 and 48, and preset the corrected present position data into the position register 43 when a power supply is restarted. An output terminal of the AND circuit 461 is connected to the input terminal of the accumulating register 424.

In case where a power supply is restarted, the corrected present position output of the position correcting section 45 is fed through the AND gate 461 to the cleared registers 424 in the tool position calculating unit 42 and to the position register 43 where it is stored. Accordingly, the corrected present position output of the position counter 45 is delivered to the control unit 24. Thereafter, a value corresponding to the present position of the machine tool as calculated at the tool position calculating unit 42 based on the above-mentioned steady state operation of the NC system is stored in the register 43. As a result, an output corresponding to the actual present position of the machine tool is always deliverd from the position register 43 to the control unit 24 irrespective of power interruption.

The correction operation of the position correcting section 45 can be performed in a timing fashion by passing the initializing pulse through the delay circuits 47 and 48. The idea of storing only the contents (rotation angle) of the counter B412 in the position counter 41 newly into the memory B442 is based on the reason that there is no chance that the machine tool will make one or more rotations until it is stopped.

In the normal machining operation the machine tool position processing unit 22 delivers an output representative of the present position of the machine tool and when a current supply is recovered after power interruption the processing unit 22 delivers an output representative of the corrected present position of the machine tool.

The operation of the NC system according to this invention will be explained by referring to FIG. 5.

Now suppose that the machine tool is machining a workpiece. The movement position of the movable section 30 of the machine tool is detected at the resolver 18. When at time $t1$ the rotation angle of the resolver 18 (or variation of the machine tool) is represented by $\theta 1$ as shown in FIG. 5(a), an output as shown in FIG. 5(c) is obtained from the rotor winding 183 of the resolver 18.

It will be evident that the output of the resolver 18 is phase shifted 90° from the exciting signal (sine wave) of the resolver as shown in FIG. 5(b). The output of the resolver 18 is converted at the wave shaping circuit 21 from an analog signal to a digital signal as shown in FIG. 5(e) and shaped into a clock pulse, as shown in FIG. 5(f), corresponding to the unit rotation angle of the resolver. The output of the wave shaping circuit 21 is supplied to the machine tool position calculating unit 22. When the position counter 41 in the unit 22 receives the output of the wave shaping circuit 21 a reference signal of the reference counter 12 is stored into the position counter 41 as shown in FIG. 5(d). Suppose that at sampling time $t1$ the rotation angle $\theta 1$ of the resolver 18 (variation of the machine tool) is represented by 760/1000. Then, the counter B412 in the position counter 41 shows a rotation angle "760" as shown in FIG. 5(h) and the counter A411 shows that the number of rotations is "0" as shown in FIG. 5(g).

With the rotation of the resolver 18 the counter B412 in the position counter 41 has the contents increased in increments of "1" as shown in FIG. 5(h) each time a pulse output (FIG. 5(f) is delivered from the wave shaping circuit 21. The output of the position counter 41 is delivered to the new position register 421 in the machine tool position calculating unit 42. As shown in FIG. 5(j) and (k) the contents of the counter A411 is stored in the memory A441 and the contents of the counter B412 is stored in the memory B442.

As shown in FIG. 5(i), at sampling time $t2$ the rotation angle $\theta 2$ of the resolver 18 (variation of the machine tool) is 998/1000 as shown in FIG. 5(a) and in consequence the contents of the counter B412 are "998". At sampling time $t2$ the contents "760" of the new position register 421 is stored by a sampling pulse SP in the old position register 422. The contents of both the registers 421 and 422 are subtracted one from the other and the result (998 − 760 = 138) is stored in the accumulating register 424. A present position output (the present position of the machine tool) of the accumulating register 424 is stored in the register 43 and then to the control unit 24. The control unit 24 performs a predetermined calculation using an instruction position from the tape reader 25 and the present position value of the machine tool and generates an output corresponding to a position error for each sampling time to cause the servo system to be driven as mentioned above. The resolver 18 detects the movement position of the moving section 30 of the machine tool.

When with the rotation of the resolver 18 the contents of the counter B412 are changed from "0" to "1" as shown in FIG. 5(g) at time $t3$ at which the contents of the counter B412 are changed from "998" to "0". The contents "1" of the counter A411 show that the resolver 18 has made one rotation. In consequence, at time $t3$ the contents of the memory A441 are "1" as shown in FIG. 5(j). At sampling time $t4$, the rotation angle of the resolver 18 is 200/1000 and the contents of the counter A411 in the position counter 41 is "1", whereas the contents of the counter B412 is "200" (see FIGS. 5(h) and (i). Likewise, "1" is stored in the memory A441 and "200" is stored in the memory B442. The contents of the counter 41 is sent to the machine tool position calculating unit 42 where a similar calculation is performed. The machine tool is driven by the above-mentioned operation. When the machine operation is interrupted, for example, at time $t5$ by turning the power switch OFF the contents of the position counters 411 and 412 are "0" as shown in FIGS. 5(g) and(h), and the contents of the registers 421, 422, 43, 451 and 42 are cleared. Since, however, the memory 44 is of a permanent storage type, a data corresponding to a present position at time t5 of the machine tool is held as shown in FIGS. 5(j) and (k). When at time t6 the power switch 23 is turned ON to restart a machining operation the contents of the memory A441 are stored, by an initializing signal as shown in FIG. 5(l), in the register A451. The wave shaping circuit 21 is operated by the output of the resolver 18 which is excited by an exciting signal when the power supply is restarted, and the position counter B412 is operated by the output of the wave shaping circuit 21. A data corresponding to the present position at time t6 of the machine tool is delivered through the counter B412 to the register B452 where it is stored. The outputs of the registers 451 and 452 are converted at the code converter 453, by the initializing signal from the delay circuit 47, from a scale of 1000 representation to a binary representation. The output of the code converter 453 is delivered through the gate circuit section 46 to the register 43 where it is preset. Since a present position output is obtained from the register 43, the machining operation can be continued.

When a power supply is interrupted due to a power failure a control section, not shown, of the NC system detects the variation of a power source voltage and stops the servo system. At the same time, it brakes the machine tool, stopping the machining operation. Since in this case the present position data is stored in the memory 44 in the machine tool position processing unit 22, the machining operation can be continued, even at the power recovery time, from the present position of the machining tool.

When a power failure occurs, the machine tool is somewhat gradually stopped, not immediately stopped, and suffers a displacement between at the power failure time and at the power recovery time. It is believed that displacement will not exceed one or more rotations of the machine tool. In consequence, at the power recovery time the counter B412 can detect the absolute position of the machine tool within a range of one rotation of the resolver 18 and, even when at time t5 (at the power failure time) the contents of the memory B422 are "200" as shown in FIG. 5(j), the contents of the position counter B412 which has detected such displacement are "667" at time t6 (at the power recovery time) as shown in FIG. 5(h). The contents of the position counter B412 are fed to the register B452 where the present position at time t5 of the machine tool is corrected.

Figure 6B:
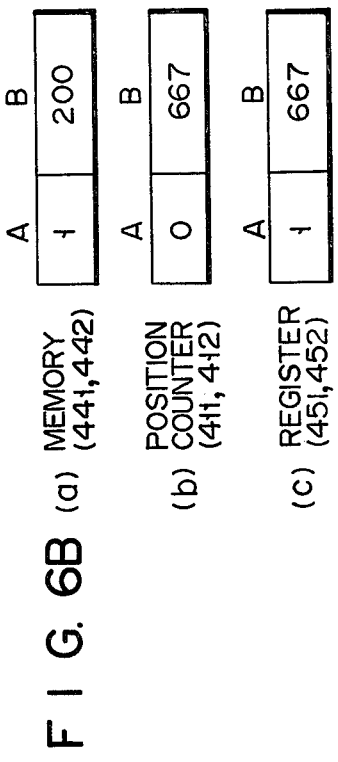
FIGS. 6A and 6B are views for explaining the operation of the circuit in FIG. 4.
Figure 6A:
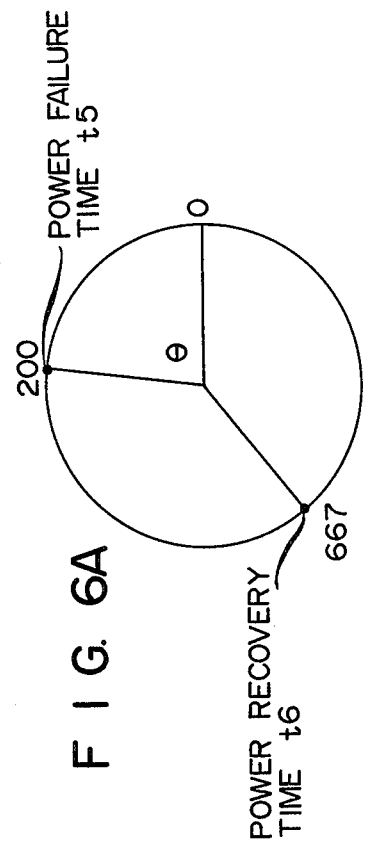

FIGS. 6A and 6B are views for explaining such a displacement correction operation.

Suppose that at time t5 (at the power failure time) the rotation angle of the resolver 18 is "200" and at time t6 (at the power recovery time) "667". Such displacement ceases to exist if, as shown in FIG. 6B(c), at time t6 the contents of the position counter B412 are stored in the register 452 and the contents of the memory A441 are stored in the register A451. In this way, data corresponding to a corrected present position of the machine tool are stored in the registers A451 and B452. The contents of the registers A451 and B452 are, after converted at the code converter 453 from a scale of 1000 representation to a binary representation, to the position register 43 for presetting. The NC system can resume the machining operation using an output corresponding to the corrected present position of the machine tool.

That is, the NC system according to this invention can correct at the power interruption time the contents of the memory and registers according to the position of the machine tool, without driving the machine tool into a correct position, so that the machine tool can machine a workpiece according to a program instruction.

What is claimed is:

1. A numerical control system having a position processing unit operated upon a power failure, comprising a tape reader for inputting a numerical data for instructing an action of a machine tool; control means for receiving an instruction data from the tape reader and a data corresponding to the present position of the machine tool and calculating an amount of movement to be made by the machine tool for each predetermined time period; means for driving the machine tool based on an output from the control means which corresponds to the amount of movement of the machine tool; detection means for detecting the position of a movable section of the machine tool; and machine tool position processing means comprised of a position counter for counting based on a scale of 1000 notation a data corresponding to the absolute position of the machine tool which is detected at said detection means, a machine tool position calculating section for calculating based on a binary notation the present position of the machine tool for each said predetermined time period, a position register for storing a data from said machine tool position calculating section which corresponds to the present position of the machine tool and for supplying said data to said control means, a permanent storage type memory for storing and holding a data corresponding to absolute position of the machine tool counted at said position counter for each said predetermined time period even at the power interruption time, a position correction section for delivering at the power recovery time an output corresponding to the corrected actual position of the machine tool as obtained by correcting the over-travel effected by the machine tool at the power interruption time, and a gate circuit section for controlling a correction operation for presetting into said position register an output data corresponding to the corrected present position of the machine tool as obtained from said position correction section.

2. A numerical control system according to claim 1, in which said position counter comprises a first scale of 1000 counter for counting the rotation angle of the machine tool as detected at said position detection means, and a second scale of 1000 counter for receiving a carry from said first scale of 1000 counter and calculating the number of rotations of the machine tool as detected at the detection means.

3. A numerical control system according to claim 1, in which said machine tool position calculating section comprises a new position register for storing for each predetermined time period a data corresponding to the absolute position of the machine tool as calculated at said position counter, an old position register for storing the contents of said new position register after a predetermined time period, a subtractor for taking a difference between the contents of said new position register and the contents of said old position register, and a register for accumulating difference values from said subtractor for each predetermined time period.

4. A numerical control system according to claim 1, in which said memory comprises a first memory for storing the rotation angle of the machine tool as counted at said position counter, and a second memory for storing the number of rotations of the machine tool as counted at said position counter.

5. A numerical control system according to claim 1, in which said position correction section comprises a first register for storing a data corresponding to the rotation angle of the machine tool as stored in said position counter, a second register for storing a data corresponding to the number of rotations as stored in said memory, and a code converter for converting to a binary equivalent, a data corresponding to the corrected position of the machine tool as stored in a scale of 1000 code in said first and second registers.

6. A numerical control system according to claim 1, in which said gate circuit section comprises an AND gate for controlling a corrected present position output of said position correction section and permitting it to be stored in said machine tool position calculating section and permitting it to be present into said position register.

7. A numerical control system according to claim 1, in which said position detection means is a resolver.

8. A numerical control system according to claim 1, further comprising a reference counter for cyclically producing a reference signal in response to the clock pulse from said clock pulse generator; and means including a first detector for detecting a predetermined value of the output of the reference counter, a counter for frequency dividing the output of the first detector into a predetermined value, and a second detector for detecting a predetermined value of the output of the counter, said means producing a sampling signal for determining said predetermined time period.

9. A numerical control system having a position processing unit operated upon a power failure, comprising a tape reader for inputting a numerical data for instructing an action of a machine tool; control means for receiving an instruction data from the tape reader and a data corresponding to the present position of the machine tool and calculating an amount of movement to be made by the machine tool for each predetermined time period; means for driving the machine tool based on an output from the control means which corresponds to the amount of movement of the machine tool; detection means for detecting the position of movable section of the machine tool; and machine tool position processing means comprised of a position counter for counting based on a scale of 1000 notation a data corresponding to the absolute position of the machine tool which is detected at said detection means, a machine tool position calculating section for calculating based on a binary notation the present position of the machine tool for each said predetermined time period, a position register for storing a data from said machine tool position calculating section which corresponds to the present position of the machine tool and for supplying said data to said control means, a permanent storage type memory for storing and holding a data corresponding to absolute position of the machine tool counted at said position counter for each said predetermined time period even at the power interruption time, a position section for delivering at the power recovery time an output corresponding to the corrected actual position of the machine tool as obtained by correcting the overtravel effected by the machine tool at the power interruption time, a gate circuit section for controlling a correction operation for presetting into said position register an output data corresponding to the corrected present position of the machine tool as obtained from said position correction section, and a wave shaping circuit for supplying a pulse signal to said machine tool position processing means for each unit rotation angle of the machine tool as detected at said detection means when the output voltage of said detection means varies from a position level to a negative level, said wave shaping circuit comprising a sense amplifier for amplifying an output from said detection means and converting it to a rectangular wave, an inverter for inverting the output of the sense amplifier, a first flip-flop circuit adapted to be set and reset by the clock pulse from said clock pulse generator in accordance with the output variation of the sense amplifier, a second flip-flop circuit adapted to be set and reset by the output of the first flip-flop in response to the clock pulse, and an AND gate for gating both outputs of said first and second flip-flops.

* * * * *